Feb. 12, 1935. C. W. BELL Re. 19,454
REMOTE CONTROL APPARATUS
Original Filed Jan. 31, 1929
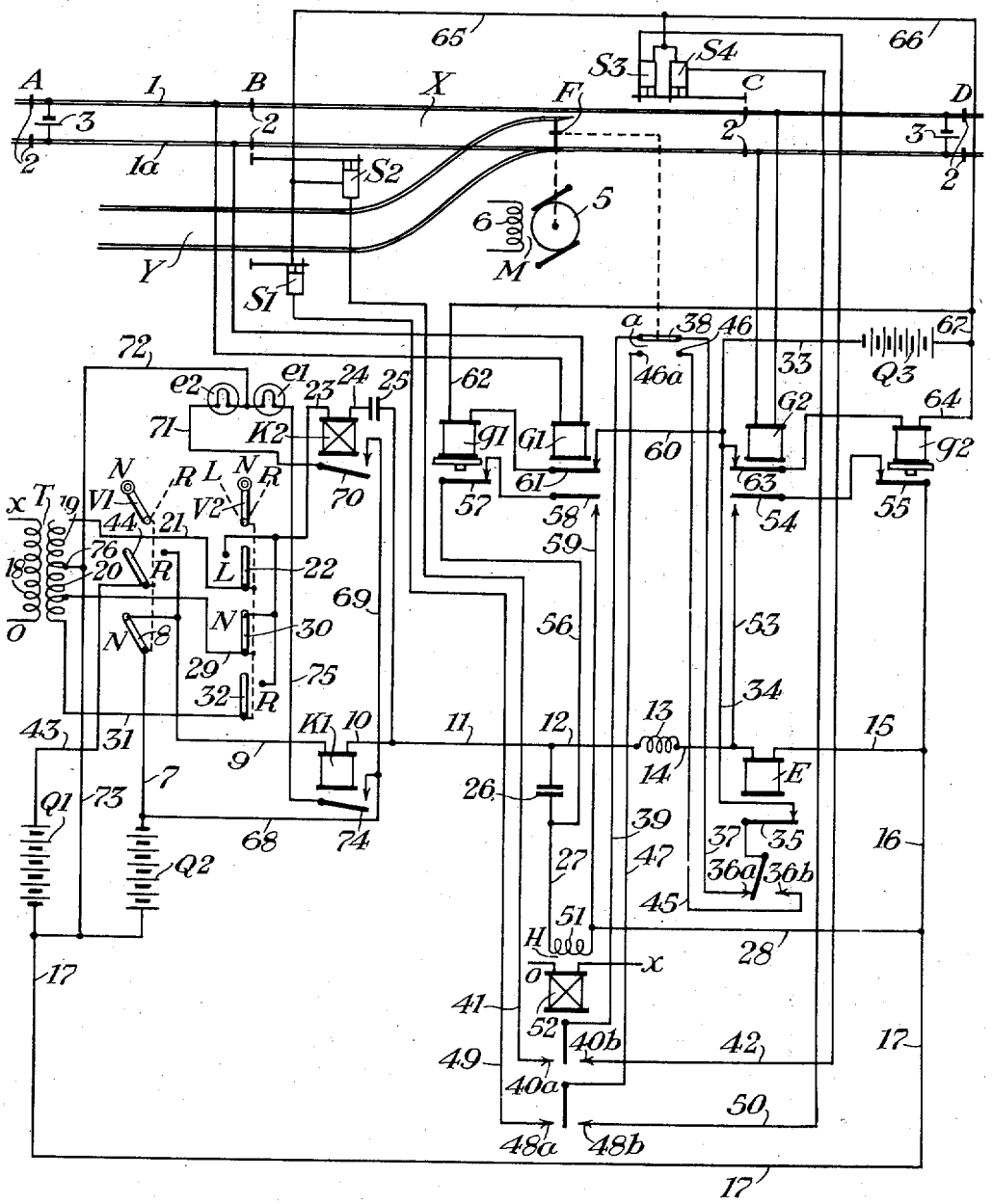
INVENTOR:
C. W. Bell,
BY A. L. Vencill
His ATTORNEY Reissued Feb. 12, 1935

Re. 19,454

UNITED STATES PATENT OFFICE 19,454

REMOTE CONTROL APPARATUS

Charles W. Bell, Wilkinsburg, Pa., assignor to The Union Switch & Signal Company, Swissvale, Pa., a corporation of Pennsylvania Original No. 1,779,418, dated October 28, 1930, Serial No. 336,413, January 31, 1929. Application for reissue July 27, 1932, Serial No. 625,139

6 Claims. (Cl. 246—3)

My invention relates to remote control apparatus, and particularly to apparatus for safely controlling traffic governing devices such as railway switches and signals from a distant point.

One feature of my invention is the provision of means including non-coded currents of different characteristics for separately controlling a switch and a signal and two approach indications over one pair of conductors.

I will describe one form of apparatus embodying my invention, and will then point out the novel features thereof in claims.

The accompanying drawing is a diagrammatic view showing one form of apparatus embodying my invention.

Referring to the drawing, the reference characters 1 and 1*a* designate the rails of a stretch X of railway track connected by means of a switch F with a siding Y. Switch F, in its normal position as shown in the drawing, directs traffic over stretch X only, and, in its reverse position, directs traffic over stretch X to or from siding Y.

The rails of stretch X are divided by insulated joints 2 to form an approach track section A—B west of switch F and which as shown in the drawing is to the left, and section C—D east of switch F and which as shown in the drawing is to the right. Each of these track sections is provided with a track circuit, which is supplied with current by a battery 3 connected across the rails adjacent one end of the section. The track circuit for section A—B includes the track relay G1, and the track circuit for section C—D includes the track relay G2. Slow releasing repeater relays, designated by the reference characters *g*1 and *g*2, are controlled respectively by front contacts of track relays G1 and G2.

Signals designated by the reference characters S1, S2, S3 and S4 govern movements of traffic over switch F, signals S2 and S3 governing over switch F in its normal position, and signals S1 and S4 governing over switch F in its reverse position. Each of these signals as here shown is of the semaphore type.

As indicated in the drawing, switch F is operated by a motor M comprising an armature 5 and a field winding 6, which is controlled in any suitable manner by the polarized relay E. An example of such control is shown in Fig. 1 of the drawing included in my co-pending application filed May 19, 1928, Serial No. 279086 for Remote controlling apparatus, in which motor M is controlled by a polarized relay R and a circuit controller *a*.

A polarized signal relay H, having windings 51 and 52, controls signals S1, S2, S3 and S4 in accordance with the position of switch F. Winding 52 is continuously supplied with alternating current from a suitable source over wires *x* and *o*.

Switch control relay E and signal control relay H are controlled over a pair of conductors 11 and 17 by manually operable levers V1 and V2 respectively, which may be included in a group of such levers at some central location, such as a train despatcher's office. Lever V1 has a normal position N and a reverse position R, and is provided with contacts 8 and 44 which are closed only while lever V1 is in its N or its R position respectively. Lever V2 has a normal position N, a reverse position to the left designated by the reference L, and a reverse position to the right designated by the reference R. Lever V2 is provided with contacts 22, 30 and 32 which are closed only while lever V2 occupies its L, N, or R positions respectively.

Indication of the approach of a train in sections A—B or C—D is provided by lamps *e*2 and *e*1 which are controlled by relays K2 and K1 respectively. A transformer T supplies current through the contacts of lever V2 for operating relays K2 and H. The primary winding 18 of transformer T is continuously supplied with alternating current from the wires *x* and *o*. The secondary side of transformer T is provided with two windings 19 and 20 having a common terminal 76. Batteries Q1 and Q2 supply direct current through the contacts of lever V1 for operating relays K1 and E. Condensers 25 and 26 prevent direct current, from batteries Q1 and Q2, from reaching relays K2 and H. Impedance winding 13 and the winding of relay K1 have sufficient reactance to prevent more than a small amount of alternating current from flowing through relays E and K1 respectively.

A battery Q3, located adjacent switch F, supplies current for operating repeater relays *g*1 and *g*2, and signals S1, S2, S3 and S4.

Having thus described, in general, the arrangement and location of the various parts comprising my invention, I will now proceed to explain the operation of the apparatus.

As shown in the drawing, all parts are in their normal condition, that is, track sections A—B and C—D are unoccupied, levers V1 and V2 are in their normal or N position, switch F is in its normal position, and each of the signals S1, S2, S3 and S4 indicates "stop".

With track sections A—B and C—D unoccupied, relays G1 and G2 are energized. Relays *g*1 and *g*2 are energized by their control circuits including battery Q3 and passing through contacts 61 and 63 of relays G1 and G2 respectively.

With lever VI in its N position, relay E is energized in its normal direction by current flowing from battery Q2, through wire 7, contact 8 of lever V1, wire 9, winding of relay K1, wires 10, 11 and 12, impedance 13, wire 14, winding of relay E, and wires 15, 16 and 17 back to battery Q2. The current flowing in this circuit, although of sufficient magnitude to cause relay E to close its front contacts, is not great enough to cause relay K1 to close its contact 74 which is therefore open.

With lever V2 in its N position, a circuit is completed passing from secondary winding 20 of transformer T, through wire 29, contact 30 of lever V2, wire 23, winding of relay K2, wire 24, condenser 25, wire 11, condenser 26, wire 27, winding 51 of relay H, and wires 28, 17 and 73 to terminal 76 of transformer T. The current flowing in this circuit is, however, of insufficient magnitude to operate either relay H or K2.

Since the front contacts of relays K1 and K2 are open, indicator lamps *e*1 and *e*2 are unlighted.

I will assume that an approaching eastbound train de-energizes relay G1, which then opens its front contact 61 in the circuit of relay *g*1, and closes its back contact 58 completing a branch path around winding 51 in the circuit previously traced for relay H. This branch path passes from condenser 26, through wire 56, contact 57 of relay *g*1, contact 58 of relay G1, and wire 59 to wire 28. Relay *g*1, being of a slow releasing type, retains its contact 57 in the closed position for a short period of time after contact 58 of relay G1 has been closed. Meanwhile, the branch path just traced permits sufficient current to flow to cause relay K2 to close its front contact 70. Indicator lamp *e*2 then becomes lighted by its circuit passing from battery Q2, through wires 68 and 69, contact 70, wire 71, lamp *e*2, and wires 72 and 73 back to battery Q2. As soon as relay *g*1 opens its front contact 57, thereby opening the branch path around winding 51 of relay H, the current flowing through relay K2 is so reduced that contact 70 again opens, thus extinguishing lamp *e*2.

If, on the other hand, when all parts are again in their normal condition as previously described, an approaching westbound train de-energizes relay G2, the circuit for relay *g*2 is opened at contact 63 of relay G2, and a branch path around relay E is completed through back contact 54 of relay G2. This branch path passes from wire 14, through wire 53, contact 54, and contact 55 of relay *g*2 to wire 16. By the completion of this branch path, the resistance in series with relay K1 is so reduced as to permit sufficient current to flow to cause relay K1 to close its front contact 74, thereby completing the lighting circuit of lamp *e*1. This lighting circuit passes from battery Q2, through wire 68, contact 74, wire 75, lamp *e*1, and wires 72 and 73 back to battery Q2. Lamp *e*1 is thus lighted, indicating to the despatcher that an approaching train has entered section C—D.

I will now assume that all parts are again in their normal condition as previously described, and that the despatcher desires to clear signal S2 for an eastbound train to move over switch F. He accordingly operates lever V2 to its R position, thus completing, through contact 32 of lever V2, a circuit for relay H passing from secondary winding 20 of transformer T, through wire 31, contact 32, wire 23, winding of relay K2, wire 24, condenser 25, wire 11, condenser 26, wire 27, winding 51 of relay H, and wires 28, 17 and 73 to terminal 76 of transformer T. Sufficient current then flows to cause relay H to close its contacts to the left position, but not to cause relay K2 to close its front contact. Relay H, upon closing its contacts to the left position, completes, through its contact 40*a*, the operating circuit for signal S2 passing from battery Q3, through wires 33 and 34, front contact 35 of relay E, normal contact 36*a* of relay E, wire 37, contact 38 of circuit controller *a* which is operated by switch F, wire 39, contact 40*a* of relay H, wire 41, operating mechanism of signal S2, and wires 65, 66 and 67 back to battery Q3. Signal S2 is then operated to its "proceed" position. If, now, an approaching eastbound train de-energizes relay G1, the branch path around winding 51 of relay H becomes closed as previously described, causing relay K2 to close its contact 70 and lamp *e*2 to become lighted by the circuit already traced.

I will next assume that all parts are again in their normal condition and that the despatcher desires to reverse switch F for a train to move from stretch X to siding Y. He accordingly operates lever V1 to its R position, thus completing a circuit by which current flows in the reverse direction through the winding of relay E. This circuit passes from battery Q1, through wires 17, 16 and 15, winding of relay E, wire 14, impedance 13, wires 12, 11 and 10, winding of relay K1, wire 9, contact 44 of lever V1, and wire 43 back to battery Q1. Relay E then closes its polar contacts in the reverse position, causing switch F to be operated to its reverse position.

If, then, the despatcher desires to clear signal S4, he will operate lever V2 to its L position, sending current through winding 51 of relay H in a reverse direction with respect to the current flowing through winding 52. The circuit, by which this current of reverse relative polarity travels, passes from terminal 76 of transformer T, through wires 73, 17, and 28, winding 51 of relay H, wire 27, condenser 26, wire 11, condenser 25, wire 24, winding of relay K2, wire 23, contact 22 of lever V2, and wire 21 to secondary winding 19 of transformer T. Relay H then closes its contacts toward the right, completing the operating circuit for signal S4 passing from battery Q3, through wires 33 and 34, front contact 35 of relay E, reverse contact 36*b* of relay E, wire 45, contact 46—46*a* of circuit controller *a* and which is now closed on account of switch F being in its reverse position, wire 47, contact 48*b* of relay H, wire 50, operating mechanism of signal S4, and wires 66 and 67 back to battery Q3. The arm of signal S4 is then operated to its "proceed" position. If now a train de-energizes relay G2, lamp *e*1 will become lighted as previously described.

From the foregoing descriptions for typical traffic moves, the operation of the apparatus shown in the accompanying drawing will be readily understood for other traffic moves.

Although I have herein shown and described only one form of remote control apparatus embodying my invention, it is understood that various changes and modifications may be made therein within the scope of the appended claims without departing from the spirit and scope of my invention.

Having thus described my invention, what I claim is:

1. In combination with a railway switch and a signal for governing the movement of traffic over said switch, a first manually operable lever, a second manually operable lever, a pair of line wires extending from a point adjacent said levers to a point adjacent said switch, a first source of current, a second source for supplying current of a different character than current supplied by said first source, means for controlling the operation of said switch by current from said first source supplied to said line wires by said first lever, means for controlling said signal by current from said second source supplied to said line wires by said second lever, two track sections adjacent said switch, a track circuit for each of said sections each including a track relay, a first approach indication means controlled through a contact of the first of said track relays by current from said first source supplied to said line wires by said first lever, and a second approach indication means controlled through a contact of the second of said track relays by current from said second source supplied to said line wires by said second lever.

2. In combination with a railway switch and a signal for governing the movement of traffic over said switch, a first manually operable lever, a second manually operable lever, a pair of line wires extending from a point adjacent said levers to a point adjacent said switch, a first source for supplying direct current, a second source for supplying alternating current, a polarized first control relay responsive to direct current from said first source, a second control relay responsive to alternating current from said second source, a first and a second approach track section for said switch, a track circuit for each of said sections each including a track relay, a slow releasing repeater relay for each of said track relays each controlled by a front contact of its track relay, a first indication relay responsive to direct current, a second indication relay responsive to alternating current, a circuit including said first control relay and said first indication relay as well as said line wires in series and an impedance between said first control relay and one of said line wires having high reactance to alternating current but only low resistance to direct current, means for supplying said circuit with current of normal or reverse polarity from said first source by said first lever and of sufficient magnitude to operate said first control relay but not said first indication relay, a branch path around said first control relay in said circuit including a back contact of the first track relay and a front contact of its repeater relay, which branch path when closed permits sufficient current to flow to operate said first indication relay, a second circuit including said second control relay and said second indication relay as well as said line wires in series and a condenser between said second control relay and one of said line wires and also a condenser between said second indication relay and one of said line wires for preventing the flow of direct current but permitting the ready flow of alternating current, means for supplying said second circuit with current from said second source by said second lever and of sufficient magnitude to operate said second control relay but not said second indication relay, a branch path around said second control relay in said circuit including a back contact of the second track relay and a front contact of its repeater relay, which branch path when closed permits sufficient current to flow to operate said second indication relay, indication means controlled by said first indication relay, indication means controlled by said second indication relay, means for controlling the operation of said switch by said first control relay, and means for controlling the operation of said signal by said second control relay.

3. In a traffic controlling system for railroads, the combination with a distant signal and a local office, a circuit connecting said office and signal location, means for controlling said signal over said circuit in accordance with the direct current voltage manually applied to said circuit at said office, a source of alternating current connected across said circuit at said office, an alternating current responsive device at said office connected in series with said alternating current source, and means at said signal location for controlling the flow of alternating current through said alternating current responsive device without interfering with the flow of said direct current in said circuit.

4. In a traffic controlling system for railroads, the combination with a distant signal and a local office, a circuit connecting said office and signal location, means for controlling said signal over said circuit in accordance with the direct current voltage manually applied to said circuit at said office, a source of alternating current connected across said circuit at said office, an alternating current responsive device at said office connected in series with said alternating current source, means at said signal location for controlling the flow of alternating current through said alternating current responsive device without interfering with the flow of said direct current in said circuit, and indicating means controlled by said alternating current responsive device.

5. In a traffic controlling system for railroads, the combination with a distant signal and a local office, a circuit connecting said office and signal location, means for controlling said signal over said circuit in accordance with the direct current voltage manually applied to said circuit at said office, a source of alternating current connected across said circuit at said office, an alternating current responsive device at said office connected in series with said alternating current source, means at said signal location for controlling the flow of alternating current through said alternating current responsive device without interfering with the flow of said direct current in said circuit, indicating means controlled by said alternating current responsive device, and means at said signal location for controlling the flow of direct current through said circuit without interference with the flow of alternating current through said circuit.

6. In a traffic controlling system for railroads, the combination with a distant signal and a local office, a circuit connecting said office and signal location, means for controlling said signal in accordance with the applied direct current voltage manually applicable to said circuit at said office, a source of alternating current connected across said circuit at said office, an alternating current responsive device at said office connected in series with said alternating current source, means at said signal location for controlling the flow of alternating current through said alternating current responsive device without interfering with the flow of said direct current, indicating means controlled by said alternating current responsive device, means at said signal location for controlling the flow of direct current through said circuit without interference with the flow of alternating current through said circuit, and other indicating means at said office for indicating the flow of direct current in said circuit.

CHARLES W. BELL.